United States Patent
Lebas et al.

[11] Patent Number: 6,001,153
[45] Date of Patent: Dec. 14, 1999

[54] METHOD OF DE-ACIDIFICATION IN WHICH ACID GASES ARE PRODUCED IN LIQUID PHASE

[75] Inventors: Etienne Lebas; Alexandre Rojey, both of Rueil Malmaison, France

[73] Assignee: Institut Francais du Petrole, Rueil Malmaison, France

[21] Appl. No.: 09/041,783

[22] Filed: Mar. 13, 1998

[30] Foreign Application Priority Data

Mar. 13, 1997 [FR] France .................................... 9703585

[51] Int. Cl.$^6$ .................................................. B01D 19/00
[52] U.S. Cl. .............................. 95/181; 95/183; 95/193; 95/204; 95/235; 95/236
[58] Field of Search .......................... 95/235, 236, 204, 95/181, 183, 179, 178, 180, 187, 193, 194

[56] References Cited

U.S. PATENT DOCUMENTS

| | | | |
|---|---|---|---|
| 3,266,220 | 8/1966 | Woertz ........................................ | 95/236 |
| 3,531,917 | 10/1970 | Grunewald et al. ........................ | 95/236 |
| 3,975,172 | 8/1976 | Ranke ......................................... | 95/236 |
| 4,097,250 | 6/1978 | Pagani et al. .............................. | 95/183 |
| 4,305,733 | 12/1981 | Scholz et al. .............................. | 95/236 |
| 4,332,596 | 6/1982 | Ranke et al. .............................. | 95/179 |
| 4,483,834 | 11/1984 | Wood ......................................... | 423/228 |
| 4,530,827 | 7/1985 | Heisel et al. .............................. | 95/235 |
| 4,576,615 | 3/1986 | Netzer et al. .............................. | 95/236 |
| 4,695,672 | 9/1987 | Bunting ....................................... | 95/180 |
| 4,979,966 | 12/1990 | Rojey et al. .............................. | 95/236 |
| 5,066,314 | 11/1991 | Leites et al. .............................. | 95/236 |
| 5,387,277 | 2/1995 | Brasier ....................................... | 95/187 |
| 5,735,936 | 4/1998 | Minkkinen et al. ....................... | 95/236 |
| 5,782,958 | 7/1998 | Rojey et al. .............................. | 95/236 |
| 5,797,981 | 8/1998 | Collin et al. .............................. | 95/235 |

FOREIGN PATENT DOCUMENTS

| | | |
|---|---|---|
| 416364 | 8/1971 | Australia . |
| 0054783 | 6/1982 | European Pat. Off. . |

*Primary Examiner*—Duane S. Smith
*Attorney, Agent, or Firm*—Antonelli, Terry, Stout & Kraus, LLP

[57] ABSTRACT

A method of treating a fluid containing at least methane and at least one acid gas and producing the acid gas or gases in liquid form. The method includes a step of regenerating the solvent, operated at a pressure whose value is at least equal to the bubble pressure of the mixture of acid gases produced in liquid form, a step in which the gaseous fraction from the regeneration step is rectified in a contact zone by separating at least some of the solvent from the gaseous fraction, a step in which the gaseous fraction from the modification step is cooled to a given temperature to cause at least some of the gaseous faction to condense forming at least one liquid fraction enriched with liquid acid gases and a step during which the liquid fraction of gases is separated from the remaining gaseous fraction.

19 Claims, 7 Drawing Sheets

METHOD OF DE-ACIDIFICATION IN WHICH ACID GASES ARE PRODUCED IN LIQUID PHASE

FIELD OF THE INVENTION

The present invention relates to a method of treating a gas containing one or more acid gases in order to remove some of these acid gases, the gas or gases being present in the form of a liquid phase at the end of the treatment process.

BACKGROUND OF THE INVENTION

Throughout this description, the expressions "liquid acid gas" or "acid gas in liquid form" will be used to designate the same product, namely acid gases which are present in a liquid state at the end of a processing step as opposed to a gaseous state.

The present invention is particularly well suited to processing a natural gas containing acid gases such as $H_2S$ and/or $CO_2$. In practice, it is often necessary to process this natural gas in order to remove at least some of the acid gases which it contains before transporting it.

Figure 1:
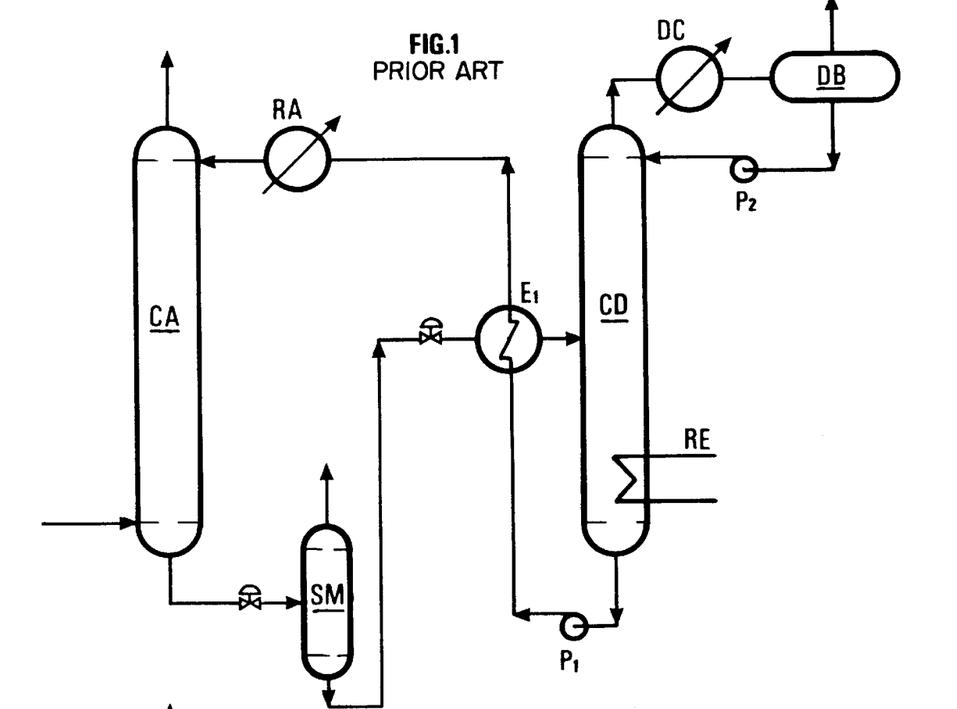
FIGS. 1 and 2 are schematic illustrations of methods of treating acid gases of the prior art, using a chemical solvent and a physical solvent respectively.

The process most commonly used to separate these acid gases from the natural gas is one whereby the acid gases are absorbed in a solvent, as illustrated in the diagram of FIG. 1 and described below. The pressurised gas is brought into contact, in counter-flow, in a column CA with a solvent which is selective as regards the acid gases, which may be a chemical solvent such as diethanolamine (DEA) or methyldiethanolamine (MDEA), for example. The gas leaving the head of the column CA has had at least some of the acid gases, which are in a gaseous state, removed from it. The solvent leaving the base of the column CA is subjected to a first expansion process so that a gaseous fraction containing some of the methane co-absorbed from the natural gas can be removed in the separating flask SM, before being heated and expanded again in the exchanger $E_1$ until a pressure close to atmospheric pressure is reached. The solvent is then regenerated in the distillation column CD, which is heated from the base by means of a reboiler RE. The gas leaving the head of the column CD is cooled in the exchanger DC by means of the ambient cooling fluid, for example water or the air. At the output of the exchanger DC, a separating flask DB separates a liquid fraction containing solvent and water, which is then delivered by means of a pump $P_2$ to the head of the column CD, and a gaseous fraction enriched with acid gases which is produced at low pressure and which is close to water saturation. The solvent phase leaving the base of the column CD is picked up by the pump $P_1$, cooled in the exchanger $E_1$ then in the exchanger RA by means of the ambient cooling fluid, for example water or the available air, and recycled to the head of the absorption column CA.

Figure 2:
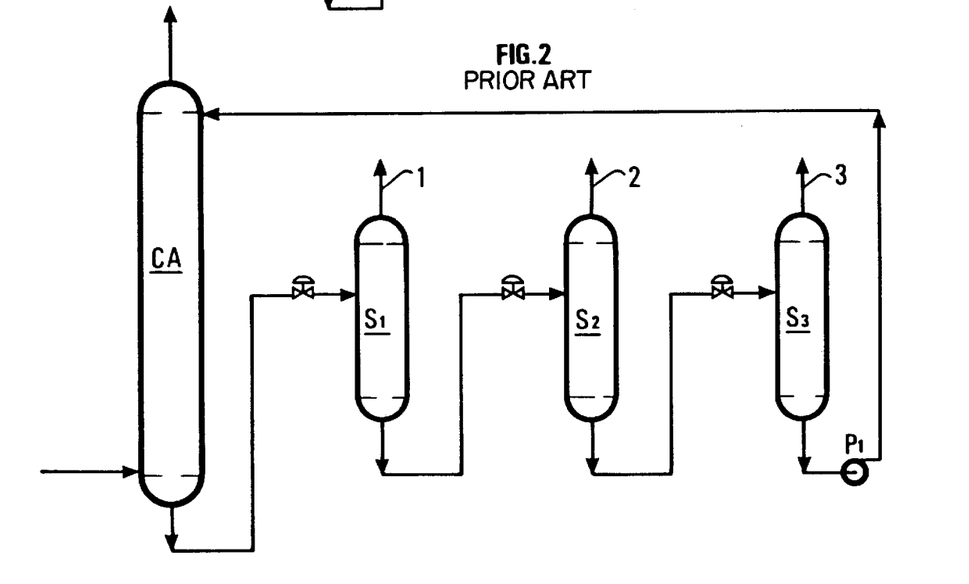

Another known approach is to use a physical solvent, for example dimethyl-ether-tetraethylene-glycol (DMETEG), which can be regenerated, as illustrated in FIG. 2, by a series of expansions to a pressure close to atmospheric pressure. Consequently, gaseous fractions enriched with acid gases are obtained at the output of the separator flasks $S_1$, $S_2$ and $S_3$ at decreasing pressure levels and are evacuated respectively via ducts 1, 2, 3. The fraction collected at the highest pressure from duct 1 contains a relatively high proportion of methane. It can be compressed and recycled to the inlet of the column CA or used as fuel gas.

The method illustrated in FIG. 2 is fine as long as the acid gases contained in the gas to be treated do not need to be completely removed, for example if the acid gas to be removed is $CO_2$. In this case, the solvent can be regenerated by a simple process of expansion without heating.

In the two examples illustrated in FIGS. 1 and 2, the acid gases separated are in gaseous form.

The acid gases are evacuated to a location which will depend on their nature. Usually, $CO_2$ is discharged directly to the atmosphere. Very toxic acid gases, such as $H_2S$, can not be discharged directly to the atmosphere and will have to be treated in a thermal installation by incineration, for example. The $SO_2$ discharged from this processing may then be discharged to the atmosphere. Another approach is to deliver the separated $H_2S$ to a Claus unit so that it can be converted into sulphur. However, conversion is expensive and not very practical on economic grounds.

In all cases, the standards and conditions which need to be observed for reasons of environmental protection are becoming increasingly stringent and the discharge of acid gases such as $SO_2$ or $CO_2$ directly to the atmosphere in gaseous form is becoming less accepted. It has therefore become necessary to find another method of processing which will avoid having to discharge directly to the atmosphere and one which will be acceptable in terms of cost.

One solutions is to re-inject these acid gases into the subsoil where they can be stored rather than evacuating or discharging them into the atmosphere. Under certain circumstances, this re-injection can improve recovery of hydrocarbons, particularly where petroleum and gas are being produced simultaneously at the re-injection location.

For re-injection, however, these acid gases have to be re-compressed at a pressure generally in excess of 10 MPa, which is expensive in terms of capital investment and high on operating costs. Furthermore, compressing acid gases with a high concentration of $H_2S$ poses technological problems which are difficult to overcome due to the risk of leaks.

SUMMARY OF THE INVENTION

The idea of the present invention is to produce the acid gases in liquid phase rather than gaseous phase so that they can be evacuated into the subsoil, for example, whilst avoiding the problems inherent in re-compressing acid gases in gaseous form, or to another appropriate location, thus avoiding any direct discharge to the atmosphere.

The present invention proposes pumping as a means of improving the pressure level needed for injecting this essentially liquid phase. Pumping is a much easier and less expensive operation than that of compressing acid gases in an essentially gaseous form.

Furthermore, the fact that the acid gases are present in substantially liquid form facilities their transport to the well and their injection into the well.

Finally, since the column of injected fluid is cooled, the mean density of the fluid can be increased and the requisite pressure level at the injection well-head thereby reduced.

This liquid phase can be produced directly after the stage at which the solvent used to separate these gases is regenerated and is done under specific conditions. For example, the pressure is set at a level that is at least greater than the bubble pressure of the acid gas mixture produced in essentially liquid phase and by preference, operations are conducted at a pressure at least in excess of or equal to this bubble pressure and preferably greater than or equal to double this bubble pressure.

The process can also be optimised by using these liquid acid gases as an agent for facilitating the recovery of hydrocarbons if they are re-injected into a subsoil containing hydrocarbon reservoirs.

It has also been discovered that the conditions under which the acid gases produced are separated can be improved by producing acid gases from which water, solvent and methane have been essentially removed.

The present invention relates to a method which allows a fluid containing hydrocarbons, methane and one or more acid gases to be processed and the acid gas or gases are produced in liquid form. The method consists in incorporating a step a), during which the gas to be processed is brought into contact with at least one solvent which is selective with respect to the gases.

The method is characterised in that at least the following steps are then applied:

b) the solvent from step a), containing a gaseous fraction in solution, enriched with acid gases, is regenerated by expansion and/or heating, producing a fraction of liquid solvent which is recycled to step a) and a gaseous fraction containing the acid gas or gases, the regeneration step being performed at a pressure value at least higher than the bubble pressure of the acid gas or the bubble pressure of the mixture of acid gases produced in essentially liquid form, c) the gaseous phase from step b) is modified in a contact zone, separating at least some of the solvent from said gaseous fraction, d) the gaseous fraction from step c) is cooled to a selected temperature at which at least some of the said gaseous fraction will condense to form at least one liquid fraction enriched with liquid acid gases and said liquid fraction of liquid acid gases is separated from the remaining gaseous fraction containing methane and co-absorbed hydrocarbons and said gaseous fraction is recycled to step a).

In one approach to implementing the method, the liquid fraction of acid gas or acid gases from step d) can be separated and at least some of the separated liquid acid gas or acid gases separated can be recycled to the contact zone (step c).

In a preferred approach to implementing the method, the pressure at step b) is at least greater than or equal to double the bubble pressure of the acid gas or mixture of acid gases.

Step a) and/or step d) can be conducted at a temperature substantially below the temperature of the ambient environment.

At the end of step d), the temperature is less than 0° C., for example.

Step d) can be conducted at a pressure at least equal to 0.5 MPa.

A physical solvent such as methanol or a chemical solvent containing a mixture of methanol and amine can be used.

In one embodiment of the method, the gaseous fraction from step d) is compressed and recycled to step a).

In another embodiment, the gaseous fraction from step c) is compressed before it is despatched to step d), the liquid fraction from step d)recycled to step c) being expanded before it is delivered to the contact zone.

At least some of the liquid faction of acid gases from step d) can be expanded and evaporated to provide, at least to a certain extent, the cooling required at one step of the method.

In one embodiment of the method, one or more acid gases are obtained in liquid form, for example a first acid gas of a given composition at the end of step c) and, after step d), a second acid gas in liquid form of a different composition from that of the first.

A gas containing at least $H_2S$ and $CO_2$ is processed to produce a gaseous fraction at step c) enriched in $CO_2$ and a liquid fraction at step d) which is enriched with $H_2S$.

The liquid fraction of liquid acid gases obtained at step d) can be purified by distillation.

The method of the present invention is perfectly suited to treating a natural gas, whereby the liquid fraction of acid gases from step d) is pumped up to a pressure level compatible with re-injection into the subsoil and is delivered into the re-injection well.

By re-injecting the acid gas or gases produced in a liquid form into a subsoil containing hydrocarbons, this embodiment advantageously allows the acid gases to be used as an aid to recovering the hydrocarbons.

Other advantages and features of the invention will become clear from the description of examples given below, which are not restrictive in any respect, and with reference to the appended drawings, of which:

DESCRIPTION OF THE INVENTION

Figure 3:
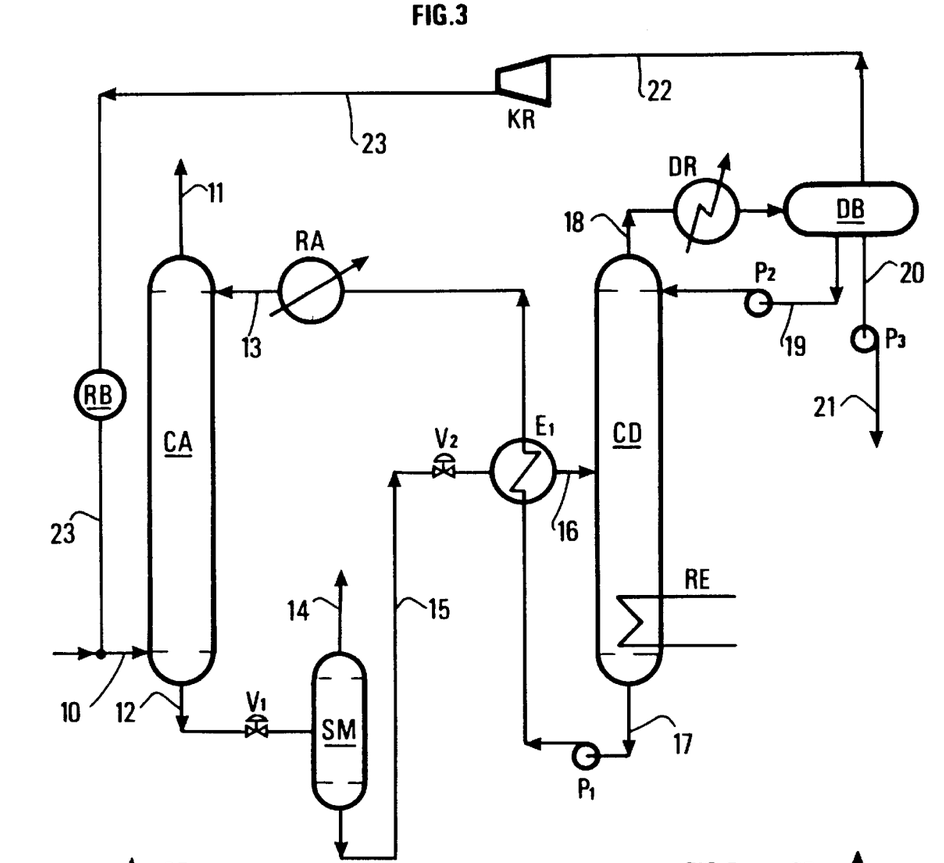
FIG. 3 is a schematic illustration of the principle underlying the process of the invention.

The method of the invention is described in the case of a gas containing hydrocarbons, methane and acid gases and with reference to the operating principle illustrated in FIG. 3.

The gas to be processed which contains the acid gas or gases to be separated is delivered under pressure via pipe 10 to the absorption column CA. This column may be a plate column, for example, or a packed column, both of which are known to the person skilled in the art. In the column CA, the gas is brought in counter-flow into contact with a solvent phase which is introduced from the head of the column via line 13. This end of this step produces:

the treated gas from which acid gases have essentially been removed, which is discharged from the head of the column CA via line 11 and the solvent charged with acid gases, discharged from the base of the column CA via pipe 12 and passed through an expansion valve VI where it is subjected to a first process of expansion to produce a gaseous phase rich in co-absorbed methane and a solvent phase rich in acid gases.

The gaseous phase rich in co-absorbed methane is separated from the solvent in the separating flask SM located after the valve $V_1$ and is discharged via the line The solvent phase leaving the separator flask SM via line 15 is again expanded through the expansion valve $V_2$, heated in the exchanger $E_1$ and fed via line 16 to the distillation column CD where it can be regenerated.

The distillation column CD is heated by means of a reboiler RE. The regenerated solvent inside the column CD with a low content of acid gases is evacuated from the base of the column CD via line 17 and fed back by means of pump $P_1$ in succession through the exchangers $E_1$ and RA, where it is cooled before being recycled via line 13 to the head of the column CA.

The regeneration step takes place at a pressure at least greater than the bubble pressure of the acid gas or mixture of acid gases produced in liquid form. The choice as to pressure value advantageously allows the acid gas or gases to be produced in a liquid form.

In the prior art, the solvent is generally regenerated at a pressure close to atmospheric pressure, whereas for the purposes of the invention, it is operated at a much higher pressure, for example at a pressure value in excess of the bubble pressure of the mixture of acid gases produced in liquid form.

This pressure level may be in excess of at least 1 MPa so that liquid acid gases are produced in the flask DB.

Operating regeneration at this pressure level implies cooling the column head to a sufficiently low temperature, this temperature depending in particular on the temperature of the acid gases being produced in liquid form. Consequently, if the mixture of acid gases contains $CO_2$ and $H_2S$, this temperature must be as low as the proportion of $CO_2$ is high.

In another approach to implementing the invention, only some of the gas is liquefied at the head and the liquid and gaseous fractions obtained there are separated, not only to avoid having to cool the gas at the head to a very low temperature but also to separate at least some of the acid gases, methane and co-absorbed hydrocarbons or to separate at least some of the acid gases from each other.

The gaseous phase containing the acid gases is discharged via line 18 at the head of the column CD before being cooled to a temperature below the ambient environment, for example by water or coolant air provided in an exchanger DR in order to condense a liquid fraction rich in acid gases, these acid gases being in the form of a liquid phase. The liquid fraction thus obtained is separated from the remaining gaseous fraction in the separator flask DB. A part of these liquid acid gases is evacuated from the separator flask DB via line 19 before being delivered by means of the pump $P_2$ as reflux to the head of the modifier zone of the distillation column CD. The remaining part of the liquid acid gases is discharged from the flask via line 20 by means of the pump $P_3$. As it passes through the pump, it reaches a relatively high pressure level, for example in excess of 10 MPa, with a relatively low energy expenditure so that it can be injected back into the subsoil via line 21, for example.

The separated gaseous fraction containing the methane and co-absorbed hydrocarbons is evacuated from the separator flask DB via line 22. It may be picked up by a compressor KR, then cooled by an exchanger RB and recycled through line 23 to the inlet of the absorption column CA.

The method implemented in accordance with the invention as a means of treating a fluid such as a gas containing methane and one or more acid gases consists of at least the following steps:

a) the gas to be processed, containing the acid gas or gases, is brought into contact with at least one solvent which is selective with respect to the acid gases, b) the solvent from step a) and containing a gaseous fraction enriched with acid gases in solution is regenerated by expansion and/or heating to produce a liquid solvent which is recycled to step a) and a gaseous fraction containing the acid gas or gases, the regeneration step being conducted at a pressure level at least in excess of the value of the bubble pressure of the acid gas or the bubble pressure of the mixture of acid gases produced in liquid form, c) the gaseous fraction from step c) is modified at a temperature which will cause at least a liquid fraction enriched with liquid acid gases to condense and the greater part of the liquid fraction rich in acid gases is separated from the remaining gaseous fraction containing the methane and co-absorbed hydrocarbons and said gaseous fraction is recycled to step a).

In one embodiment, step d) is operated at a temperature below the temperature of the ambient environment, using a cooling fluid for example.

Some of the liquid fraction rich in acid gases from step d) can be recycled to step c) as reflux in the contact zone (step c) and some of the remaining fraction can be discharged.

In the method of the invention, the distillation column CD used to regenerate the solvent is operated by preference at a pressure substantially in excess of atmospheric pressure, preferably in excess of 0.5 MPa.

The cooling temperature at the output of the exchanger DR is preferably less than 0° C. Generally speaking, it is selected to suit the pressure at which distillation is operated in the column CD and the composition of the acid gases produced.

If the acid gases are made up of a mixture of $CO_2$ and $H_2S$, the cooling temperature is selected so that it is as low as the proportion of $CO_2$ in the acid gases produced in liquid phase is high.

In the case of a binary mixture of $CO_2$ and $H_2S$, the bubble pressure of the mixture $P_B$ can be determined for each composition on the basis of the cooling temperature.

This cooling temperature is preferably lower than the temperature $T_R$ such that:

$$P_B(T_R)=(P_R)/2$$

where $P_R$ denotes the pressure prevailing in the separator flask DB.

Consequently, if this pressure $P_R$ is equal to 2 MPa, for example, and if the acid gases produced in liquid phase are made up of a mixture of $CO_2$ and $H_2S$, the temperature $T_R$ will vary in the following manner (table 1) depending on the proportion of $H_2S$ as a molar fraction expressed as a %.

TABLE 1

| $xH_2S$ | 0 | 20 | 50 | 80 | 100 |
|---|---|---|---|---|---|
| $T_R$ | −40° C. | −38° C. | −34° C. | −25° C. | −1° C. |

Consequently, the pressure at which the regeneration step is operated in the column is preferably set at a level that is at least equal to twice the pressure value of the bubble point of the acid gas or mixture of liquid acid gases produced at the cooling temperature imposed at the head of the regenerating column.

The gaseous fraction discharged from the separator flask DB via line 22 is enriched with methane and $CO_2$. It is compressed by means of the compressor KR and can be recycled to the inlet of the absorption column CA.

It should be noted that the conditions under which the acid gases produced in liquid phase are separated can be improved in this way. In effect, the greater part of the methane which was still co-absorbed in the solvent is separated in the separator flask DB. On the other hand, by adjusting the cooling temperature, it is possible to produce a more or less selective de-acidification in $H_2S$. In practice, by selecting a relatively high cooling temperature, the greater part of the $CO_2$ absorbed with the $H_2S$ can be recycled.

EXAMPLE

The example outlined below illustrates one specific mode of operating the method.

The charge to be processed is a natural gas from which the gasoline was removed at a pressure of 6 MPa and a temperature of –30° C. Its composition is given in table 2 and its flow rate is 4.8 $MNm^3$/day.

TABLE 2

| Constituent | % mole |
|---|---|
| N2 | 1.55 |
| $CO_2$ | 4.16 |
| $H_2S$ | 6.91 |
| Methane | 81.84 |
| Ethane | 3.94 |
| Propane | 1.26 |
| Isobutane | 0.16 |
| Butane | 0.12 |
| Isopentane | 0.03 |
| Pentane | 0.02 |
| Hexane | 0.01 |
| C7+ | 0.01 |

The gas to be treated is injected into the column CA via line 10. Circulating in counter-flow is a solvent injected via line 13; it consists of 70% mole of methanol and 30% mole of water; its flow rate is 41970 kmol/h. The treated gas is discharged though line 11; it now contains no more than 0.5% mole of $CO_2$ and 4 ppm mole of $H_2S$.

The separator flask SM is operated at a pressure of 20 MPa. The gas leaving this flask via line 14 contains 82% mole of methane, 8% mole of $CO_2$ and 2% mole of $H_2S$. Its flow rate is 718 kmol/h.

The regenerating column CD is operated at a pressure of 14 MPa. The temperature of the separator flask DB is maintained at –36° C. The gas discharged via line 22 contains 42% mole of $CO_2$, 16% mole of $H_2S$ and 32% mole of methane. This gas, having a flow rate of 930 kmol/h, is recycled to the absorption column CA after being compressed to 6 MPa and cooled to –30° C.

The regenerated solvent is evacuated via pipe 17 to be recycled in column CA after cooling to –30° C.

The liquid acid gases are drawn off from the flask DB via line 20. The composition of this fluid is 35% mole of $CO_2$ and 47% mole of $H_2S$. Its pressure is then brought to re-injection pressure by means of the pump $P_3$.

Figure 4:
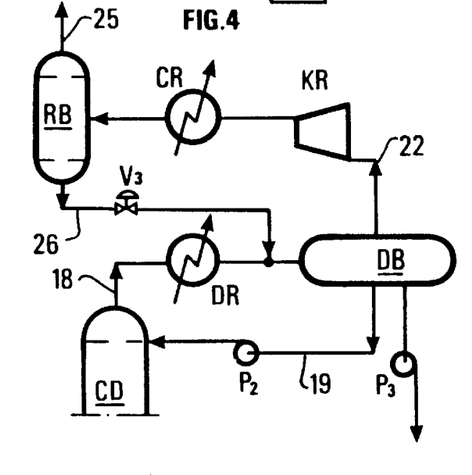
FIG. 4 shows an embodiment of the device used to optimise separation of the acid gases entrained in the gaseous phase.

FIG. 4 schematically illustrates a method which allows at least some of the acid gases contained in the gaseous fraction from step d) to be separated and evacuated via line 22, the gas leaving the compressor KR being cooled in an exchanger CR.

The liquid fraction thus obtained is separated in the separator flask RB, producing at the output of the separator flask RB a gaseous fraction enriched with methane, which is discharged via line 25 and a liquid fraction enriched with acid gases which is evacuated via line 26, expanded through the expansion valve $V_3$ and recycled to the separator flask DB. This has the advantage of reducing the quantity of acid gases recycled to the input of the absorption column CA and/or producing a gaseous fraction enriched with methane but low in acid gases which can be used as fuel gas.

Figure 5:
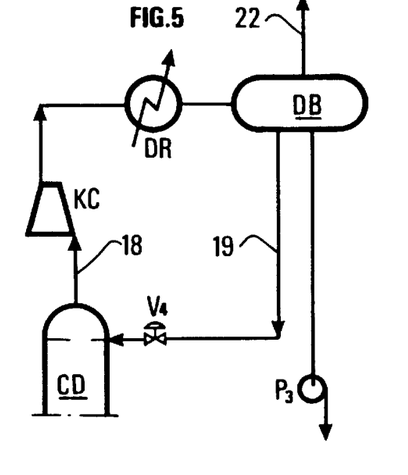
FIG. 5 shows an embodiment which facilitates condensation of the acid gases.

FIG. 5 is a schematic illustration of a means of facilitating condensation of the acid gases at the output of the exchanger DR.

The gaseous fraction leaving the head of the distillation column CD via line 18 passes into a compressor KC before being fed into the exchanger DR so that the cooling operation in this exchanger DR can be conducted at a higher pressure than the pressure at which distillation is conducted in the column CD. In this practical example, the liquid fraction of acid gases discharged via line 19 is not recycled to the distillation column CD by a pump $P_2$ but is expanded through an expansion valve $V_4$ before being delivered to the head of the modification zone of the column CD.

Figures 6, 7:
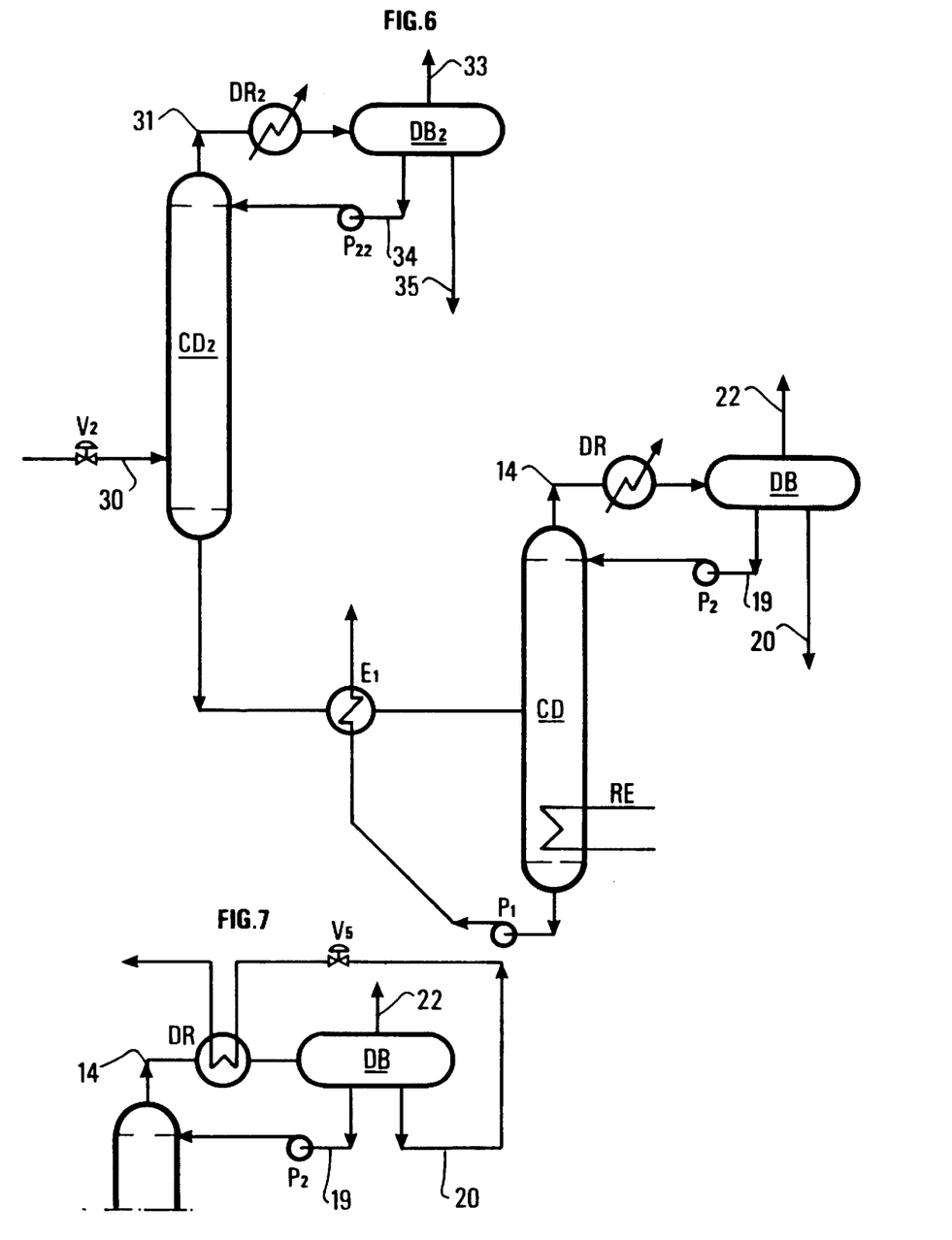
FIG. 6 is a schematic depiction of an embodiment which allows the acid gases to be obtained in liquid form of differing compositions at different stages of the method.
FIG. 7 shows an embodiment in which at least some of the acid gases in liquid phase can be used for cooling operations, FIG. 8 schematically illustrates an example of how the method is implemented when a step is incorporated upstream to remove the water contained in the gas.

FIG. 6 illustrates another variant of the method which allows two or more regeneration steps to be conducted under different conditions in order to obtain one or more fractions of acid gases of different compositions.

As compared with the diagram of FIG. 3, this device has, between the expansion valve $V_2$ and the exchanger E1, a set of means that will produce a first liquid fraction enriched in acid gases, for example $CO_2$, and, after step d) of the method, a second liquid fraction of acid gases other than $CO_2$, for example $H_2S$, before the modification step in column CD.

To this end, the procedure is to separate a first gaseous fraction enriched in methane and $CO_2$ by a simple process of expansion through the valve $V_2$ and this gaseous fraction is fed via line 30 to be modified in the column $CD_2$. This means that a gaseous fraction, from which solvent has substantially been removed and enriched in $CO_2$ can be discharged via line 31 to the head of the column $CD_2$. This gaseous fraction is cooled in the exchanger $DR_2$ and separated in a separator flask $DB_2$, producing at the output thereof a gaseous fraction discharged via line 33 and a liquid fraction enriched with $CO_2$, some of which is discharged via line 34 and recycled by means of pump $P_{22}$ as reflux to the modification column $CD_2$, whilst the remaining part of the liquid fraction rich in $CO_2$ is discharged via line 35. This latter part of the liquid fraction can be used as mentioned above.

With an arrangement of this type, a liquid fraction enriched in $CO_2$ can be produced at the output of the exchanger $DR_2$ whilst a liquid fraction enriched in $H_2S$ is produced at the output of the exchanger DR, the acid gases $CO_2$ and $H_2S$ being in a liquid form.

Each of the regenerating and modification columns must operate under pressure and temperature conditions that will allow the acid gases to be obtained in liquid form, i.e. a pressure whose level is at least equal to the bubble pressure of the acid gases produced in liquid form and preferably at least equal to twice this bubble pressure level.

FIG. 7 shows a variant of the device in which at least one of the liquid fractions of liquid acid gases obtained is expanded and evaporated before at least some of it is used for one or more cooling steps of the method.

As compared with FIG. 3, this device has an expansion valve $V_5$ arranged on the line 20 located between the separator DB and the exchanger DR and passing through the exchanger DR.

The liquid fraction of liquid acid gases evacuated at the output of the separator flask DB via line 20 is expanded and evaporated through the expansion valve $V_5$ in order to supply some of the cooling which has to be provided in the exchanger DR.

In one embodiment of the method of the invention, the fraction of liquid acid gases obtained in liquid phase can be purified by distillation in order to obtain a liquid fraction concentrated in $H_2S$, for example.

Figure 8:
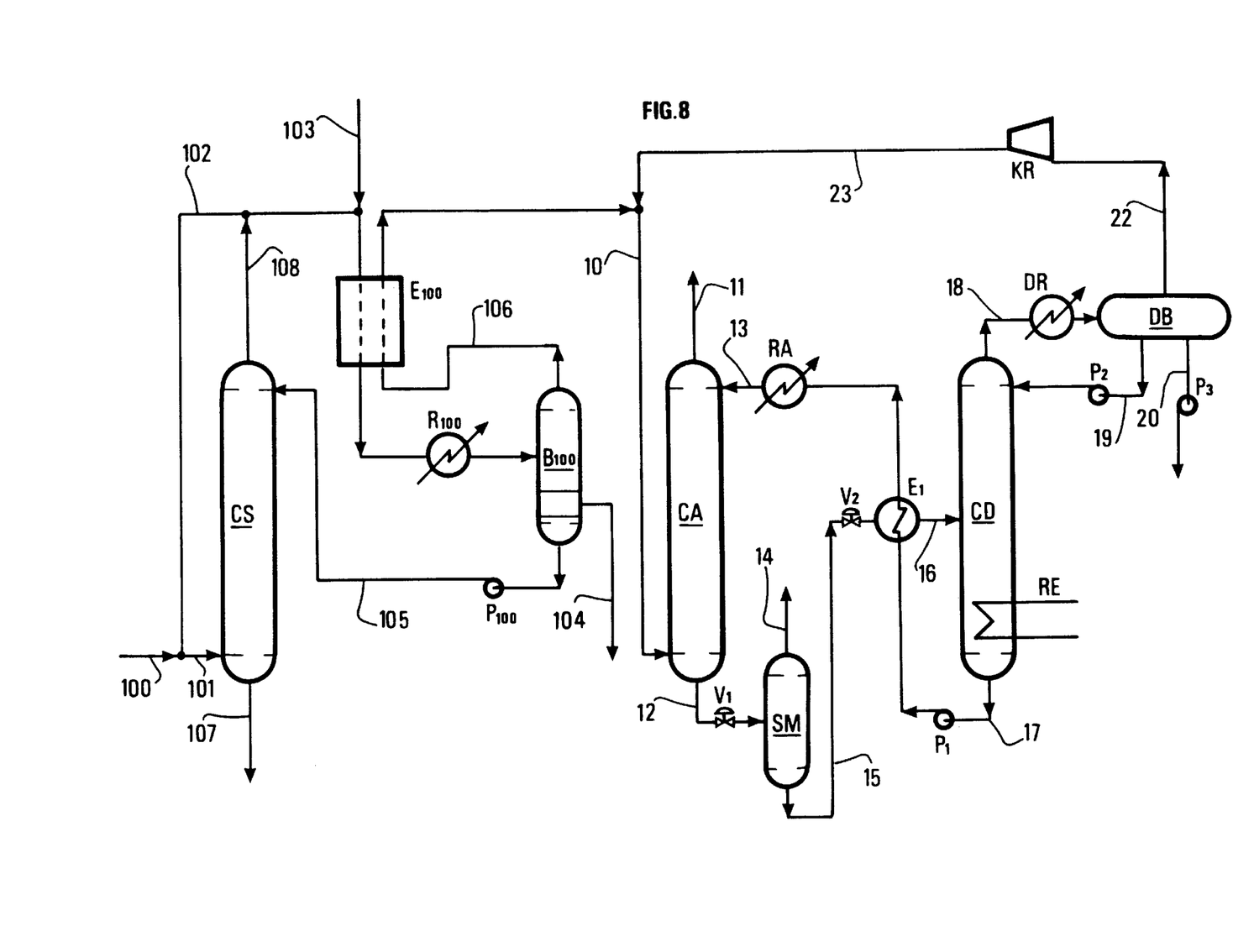

FIG. 8 illustrates an embodiment of the method incorporating a step beforehand in which water is at least partially removed from the gas.

Different solvents may be used. The solvent may be a physical solvent, such as methanol, for example.

The gas arriving via line 100 is charged with water and acid gases and may also contain condensible hydrocarbons.

A fraction of this gas is fed via line 101 to the absorption column CS, the remaining fraction passing through line 102. At the head of the column CS, an aqueous phase containing methanol in solution arrives via line 105. The aqueous phase discharged via line 107 at the base of the column CS has had the methanol substantially removed from it. The gaseous fraction leaving from the head of the column CS via line 108 is charged with methanol. It is mixed with the gaseous fraction arriving from line 102 and with additional methanol fed in via line 103. The presence of methanol has the advantage of cooling the gas whilst avoiding the formation of ice and/or hydrates. The gas is cooled successively in the exchanger $E_{100}$ by an exchange of heat with the gaseous fraction leaving the separator flask $B_{100}$ and then in the exchanger $R_{100}$ by exchange with an external cooling fluid.

At the output of the exchanger $R_{100}$, a gaseous phase is obtained from which water and condensible hydrocarbons have essentially been removed, a liquid hydrocarbon phase and an aqueous phase charged with methanol. These three phases are separated in the separator flask $B_{100}$. The liquid hydrocarbon fraction is evacuated via line 104 and the aqueous phase is discharged by means of the pump $P_{100}$ and delivered via line 105 to the head of the column CS. The gaseous phase is discharged via line 106 and fed to the exchanger $E_{100}$.

At the output of the exchanger $E_{100}$, this gaseous fraction is mixed with the gaseous fraction recycled by the compressor KR, the gaseous mixture thus obtained being fed via line 10 to the absorption column CA, where it is brought into contact with the solvent arriving at the head of the column CA at a temperature close to the temperature prevailing in the separator flask $B_{100}$, this temperature being between 0° C. and −40° C., for example. The solvent leaving from the base of the column, charged with acid gases, is regenerated in accordance with the principle proposed by the method of the invention described in FIG. 3. The gaseous fraction leaving from the head of the modification zone in the distillation column CD is cooled in the exchanger DR by means of an external cooling fluid to a temperature which may be close to the temperature at which the absorption column CA is operated, for example, i.e. at a temperature which may range between 0° C. and −40° C., for example. At the output of the exchanger DR, the steps described with reference to FIG. 3 are performed and a gaseous fraction enriched with methane is separated, discharged via line 22 and recycled via the compressor KR by line 23 to the column CA and a fraction of acid gases is produced in liquid phase, some of which is discharged via line 19 and picked up by the pump $P_2$ to be recycled to the head of the modification zone of the distillation column CD, whilst the remaining part is discharged via line 20 and delivered by the pump $P_3$ to a chosen destination, for example the subsoil, as a means of aiding hydrocarbon recovery. The regenerated solvent phase leaving the base of the distillation column CD via line 17 is recycled by pump $P_1$. It is cooled in the exchanger $E_1$ by internal exchange and then in the exchanger RA by means of an external cooling fluid before being re-introduced via line 13 to the head of the column CA.

The specific feature of this particular method of implementing the invention is that it incorporates a pre-processing step so that at least some of the water contained in the gas can be removed, the gas to be treated being cooled in the presence of methanol before being delivered to step a), where it is brought into contact with the solvent, and step a) is operated at a temperature below the temperature of the ambient environment, coolant water or air, step a) being conducted at a temperature ranging between 0° C. and −40° C., for example.

The solvent may have, mixed with the methanol, a certain content of water in order to limit the co-absorption of hydrocarbons.

This water content may range between 5 and 30% as a molar fraction.

It is also possible to use a physical solvent other than methanol. This solvent may be an alcohol, an ether or a ketone, for example.

Figure 9:
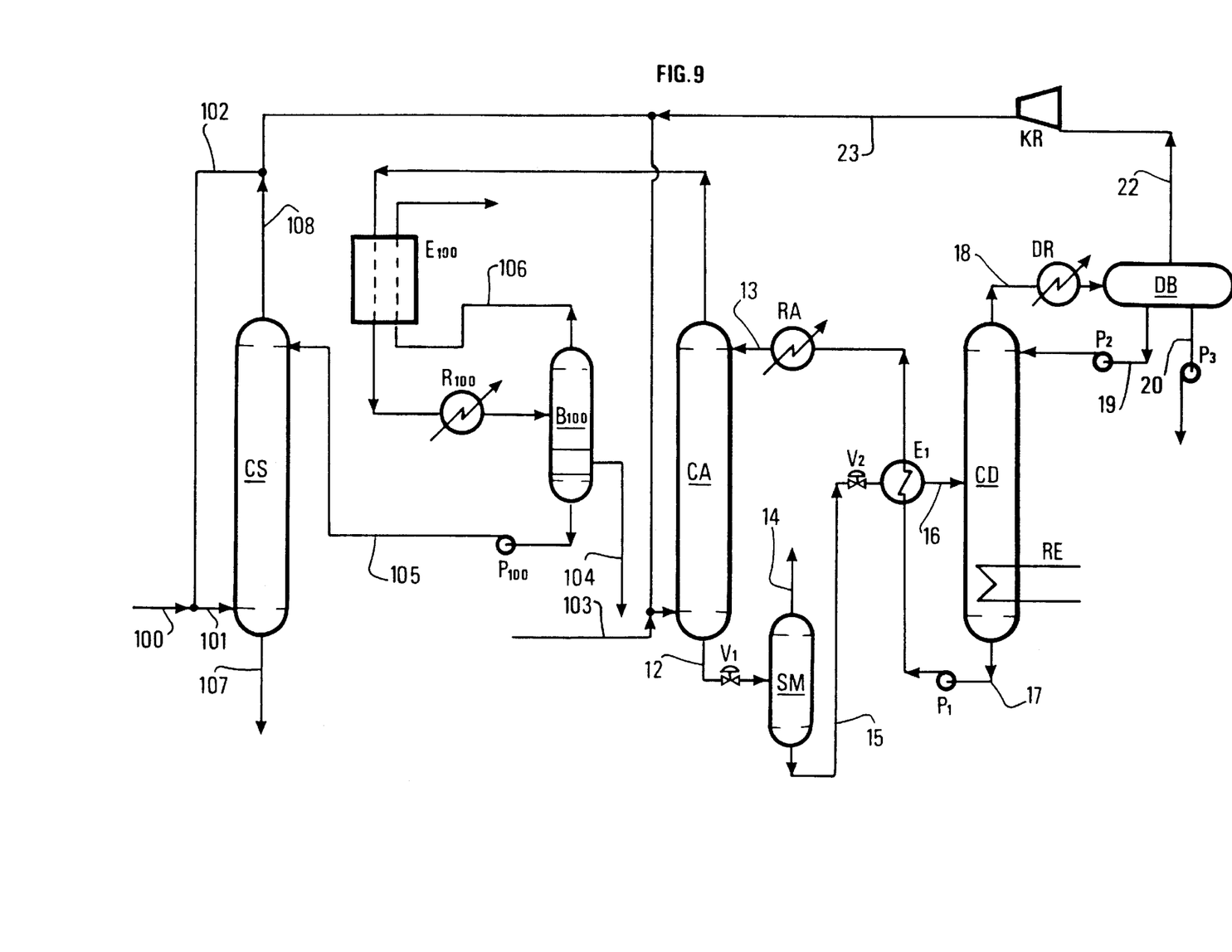
FIG. 9 shows an embodiment in which the solvent used is a chemical solvent.

FIG. 9 illustrates another way of implementing the method of the invention in which the solvent used in the column CA is a chemical solvent, such as an amine. It may be made up of a mixture of methanol and diethanolamine or methyldiethanolamine, for example.

The gas arriving via line 100 is charged with water and acid gases and may also contain condensible hydrocarbons.

A fraction of this gas is fed via line 101 to the column CS, the remaining fraction passing through line 102. At the head of the column CS, an aqueous phase containing methanol in solution arrives via line 105.

The aqueous phase discharged via line 107 at the base of the column CS has had the methanol substantially removed from it. The gaseous fraction leaving from the head of the column CS via line 108 is charged with methanol. It is mixed with the gaseous fraction arriving from line 102, then with the gaseous fraction recycled by the compressor KR via line 23 and with additional methanol introduced via line 103. The gaseous mixture thus obtained is brought into contact with a mixture of methanol, water and amine in the column CA, The gas leaving the head of column CA has essentially had the acid gases it contained at the input to the column CA removed and contains water and methanol. It may also contain condensible hydrocarbons. It is cooled successively in the exchanger $E_{100}$ by an exchange of heat with the gaseous fraction leaving the separator flask $B_{100}$, then in the exchanger $R_{100}$ by an exchange with an external cooling fluid. At the output of the exchanger $R_{100}$, a gaseous phase is obtained from which the water and condensible hydrocarbons have essentially been removed, a liquid hydrocarbon phase and an aqueous phase charged with methanol. These three phases are separated in the separator flask $B_{100}$. The aqueous phase is evacuated via line 106 and fed into the exchanger $E_{100}$, The liquid hydrocarbon fraction is discharged via line 104 and the aqueous phase is evacuated by the pump $P_{100}$ and delivered via line 105 to the head of the column CS.

The specific feature of implementing the method of the invention in this particular way is the fact that the gas from step a), which is charged with water and methanol and may also contain condensible hydrocarbons, is cooled to produce a gas from which the acid gases, methanol and condensible hydrocarbons have been substantially removed.

Different types of equipment may be used for the method of the invention. For example, it is possible to use plate columns or packed columns having a structured packing, for example. The heat exchangers may be shell and tube exchangers or plate exchangers, having brazed aluminium plates for example.

The cooling means may also be of various types and cooling may be produced by an internal or an external exchange with an external cooling fluid using an external cooling cycle or by expansion through an expansion valve or an expansion turbine.

Different layouts may be used to provide cooling for the regenerating and modification column CD.

Figure 10:
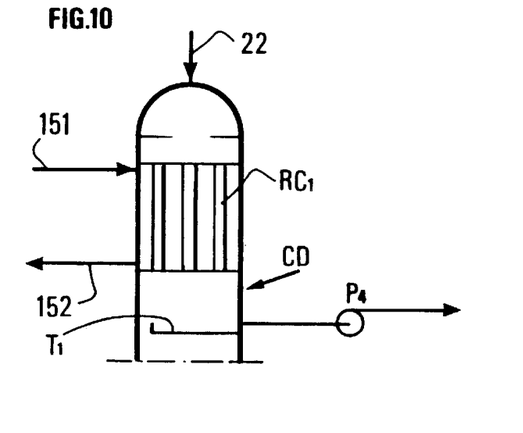
FIGS. 10 and 11 illustrate embodiments of the regenerating column.

FIG. 10 illustrates an embodiment in which the column is fitted with an integrated condenser.

An exchange surface $RC_1$ is placed inside the column and may consist of tubes, for example, in which an external coolant is circulated, arriving from line 151 and being discharged via line 152.

It may also be made from welded plates.

Cooling of the gaseous fraction circulating at the head of the column CD causes a liquid reflux, which is collected on plate $T_1$. A part of this collected liquid is evacuated by pump $P_4$ and forms the acid gases produced in liquid phase. The remaining part flows across the plate $T_1$, supplying the modification zone.

Figures 11, 12:
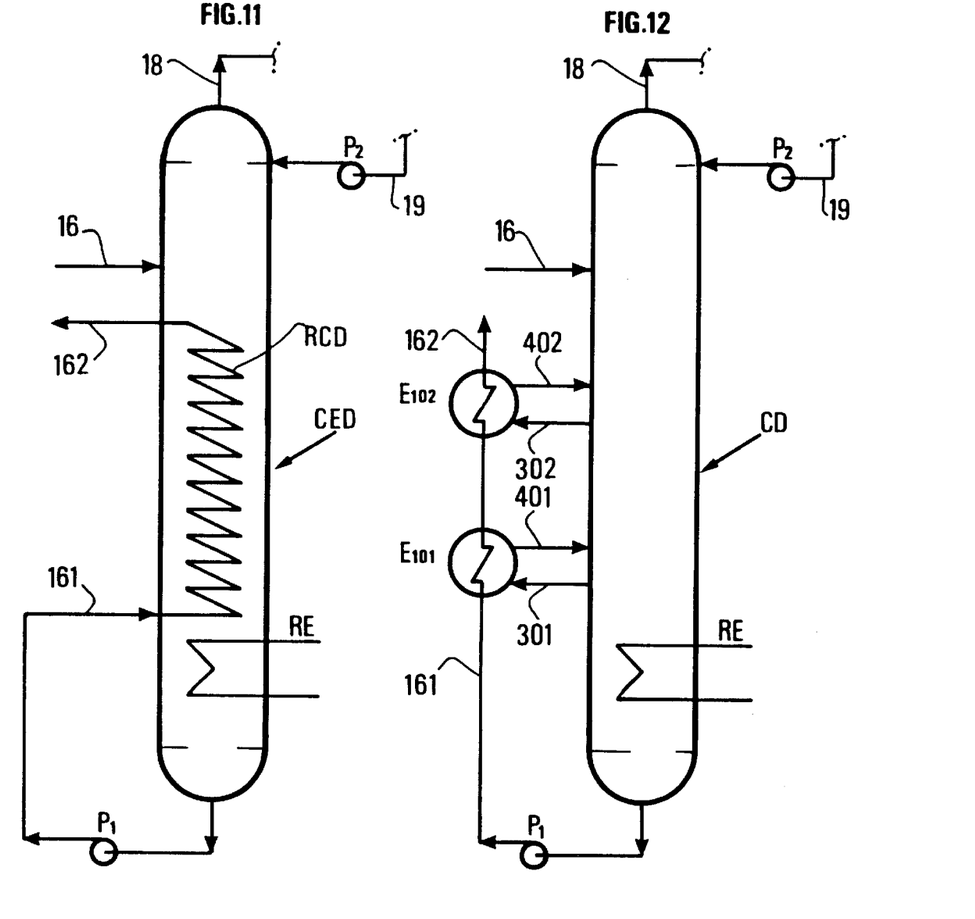
FIG. 12 is a diagram showing an alternative mode of operation and FIGS. 13 and 14 illustrate two modes of regenerating the solvent.

FIG. 11 illustrates another embodiment in which the regenerating column CED has an internal exchange surface.

The regenerated solvent leaving the base of this column at a relatively high temperature is delivered by the pump $P_1$ to this internal exchanger via line 161 and leaves by line 162.

The solvent charged with acid gases arrives via line 16 at a relatively low temperature. It is gradually heated as it circulates downwards inside the column, generating a vapour phase, the heat supplied at the base by the exchanger RE serving as a top-up only.

The regenerated solvent circulating in the internal exchanger, on the other hand, is gradually cooled and leaves via line 162 at a relatively low temperature.

The acid gases are delivered to the modification zone at a relatively low temperature and contain very little solvent, which means that the consumption of cooling power can be reduced in the exchanger DR.

The internal exchanger may have vertical tubes or tubes wound in a spiral.

It may also have vertical plates welded to one another, for example.

In one advantageous embodiment, a heat exchange is effected in counter-flow between the solvent phase charged with acid gases as it descends and the regenerated solvent phase which rises, ensuring a temperature gradient, the temperature value at the head of the exchanger being close to the temperature of the solvent charged with acid gases as they leave the absorption column and the temperature value at the base of the exchanger being close to the output temperature of the cooling column.

FIG. 12 illustrates an embodiment which offers the option of an alternative operating mode.

The regenerated solvent leaving the column CD passes into heat exchangers located outside the regenerating column CD, for example two exchangers $E_{101}$ and $E_{102}$. These exchangers may be shell and tube exchangers or plate exchangers.

The regenerated solvent circulating through these exchangers is gradually cooled, exchanging heat with a liquid fraction on the interior of each of the exchangers, the liquid fraction being taken from a plate of the column, for example, via lines 301 and 302. This produces a vapour phase which is fed back into the column via lines 401 and 402.

Figures 13, 14:
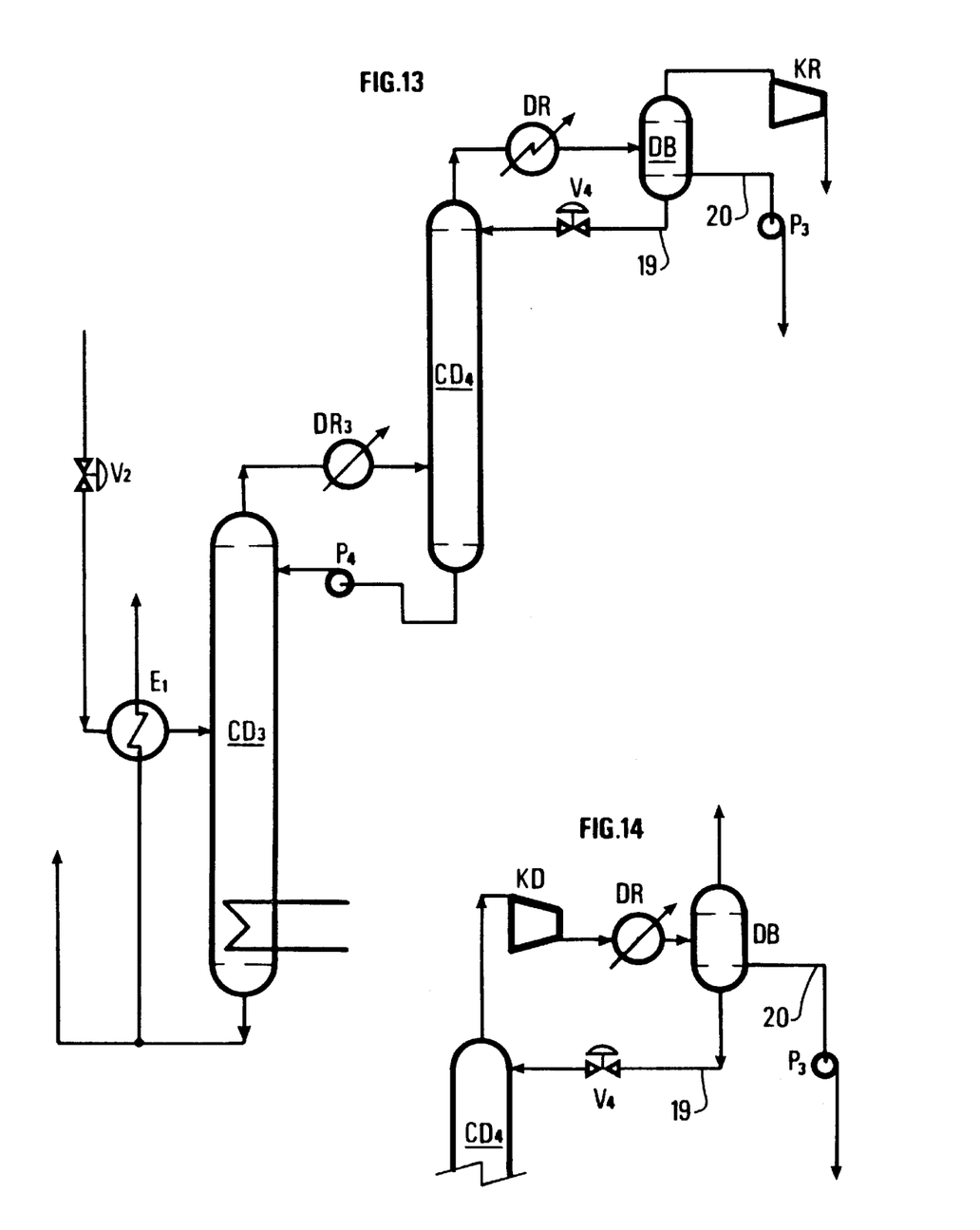

The solvent can be regenerated in at least two successive distillation operations, as illustrated in the layouts of FIGS. 13 and 14, instead of being regenerated in a single column CD (FIG. 3).

In the example illustrated in FIG. 13, the solvent is firstly regenerated in a distillation zone $CD_3$ by cooling using the ambient cooling medium, water or the available air. This first distillation separates most of the solvent entrained with the acid gases. A second distillation operation is conducted in a distillation zone $CD_4$, the vapour phase leaving from the head being partially condensed in the exchanger DR by cooling with an external coolant fluid so that the temperature can be reduced to a lower level than ambient temperature, for example between −20 and −40° C. This operation condenses a liquid phase rich in acid gases, a part of which is delivered as reflux to the distillation zone $CD_4$ via line 19 after expansion through expansion valve $V_4$. The contact in counter-flow between the gaseous fraction and this liquid reflux in the distillation zone $CD_4$ allows the acid gases to be concentrated in the vapour fraction. At the output of the exchanger DR, the two-phase mixture obtained is separated in the two-phase separator DB. The gaseous phase obtained, rich in methane and ethane, is recycled by the compressor KR. The liquid phase, rich in acid gases, is pumped by pump $P_4$ and re-injected at a pressure in excess of 10 MPa, for example.

Another possible arrangement is illustrated in FIG. 14.

A first distillation operation is conducted in a distillation zone $CD_3$, under operating conditions similar to those described in the preceding example. A second distillation operation is performed in distillation zone $CD_4$, the vapour phase leaving from the head being compressed in the compressor KD to a pressure that will allow the vapour phase separated in the separator flask DB to be directly recycled. At the output of the compressor KC, the pressure, which may range between 4 and 10 MPa, for example, is sufficient to produce a liquid phase rich in acid gases by partial condensation, providing cooling in the exchanger DR by means of the ambient medium, water or air. Part of the liquid phase rich in acid gases so produced is fed as reflux into the distillation zone $CD_4$ via line 19 after being expanded through expansion valve $V_4$. The remaining fraction is pumped by pump $P_3$ and re-injected at a pressure in excess of 10 MPa, for example.

We claim:

1. A method of treating a fluid containing hydrocarbons, methane and one or more acid gases and producing the acid gas or gases in a liquid form, comprising at least the following steps in combination:

a) bringing the fluid to be treated into contact with at least one solvent that is selective with regard to acid gas or gases to be produced in liquid form, b) expanding or heating the solvent from step a) containing a gaseous fraction in solution enriched with acid gases to regenerate and produce a liquid solvent fraction which is recycled to step a) and a gaseous fraction containing the acid gas or gases, wherein the expanding or heating step is conducted at a pressure whose value is at least greater than a bubble pressure of the acid gas or a bubble pressure of the mixture of acid gases produced in liquid form, c) modifying the gaseous fraction from step b) in a contact zone by separating at least some of the solvent from said gaseous fraction, d) cooling the gaseous fraction from step c) to a temperature whose value is selected so as to condense at least some of said gaseous fraction to form at least one liquid fraction enriched with liquid acid gases, and separating said liquid fraction of gases from the remaining gaseous fraction containing methane and co-absorbed hydrocarbons and recycling said gaseous fraction to step a).

2. A method as claimed in claim 1, characterized in that the liquid fraction of acid gases from step d) is separated and at least a part of the liquid acid gas or gases is recycled to the contact zone (step c) to be used as reflux, with some of the remaining fraction being evacuated.

3. A method as claimed in claim 1, characterized in that at least one of step a) and step d) is operated at a temperature substantially below the temperature of the ambient environment.

4. A method as claimed in claim 1, characterized in that the temperature at the end of step d) is below 0° C.

5. A method as claimed in claim 1, characterized in that step d) is operated at a pressure at least equal to 0.5 MPa.

6. A method as claimed in claim 1, characterized in that a physical solvent is used.

7. A method as claimed in claim 1, characterized in that the gaseous fraction from step d) is compressed and recycled to step a).

8. A method as claimed in claim 1, characterized in that the gaseous fraction from step c) is compressed before being fed to step d), the liquid fraction from step d) recycled to step c) being expanded before being fed to the contact zone.

9. A method as claimed in claim 1, characterized in that at least some of the liquid fraction of acid gases from step d) is expanded and 27 evaporated to provide at least one part of a cooling step during the course of the method.

10. A method as claimed in claim 1, characterized in that at the end of step c) a first acid gas is obtained and at the end of step d) a second acid gas is obtained having a different composition from that of the first.

11. A method as claimed in claim 10, characterized in that a gas containing at least $H_2S$ and $CO_2$ is treated and a gaseous fraction is obtained from step c) enriched with $CO_2$ and a liquid fraction is obtained from step d) enriched with $H_2S$.

12. A method as claimed in claim 1, characterized in that the liquid fraction of acid gases from step d) is purified by distillation.

13. A method of treating a natural gas as claimed in claim 1, characterized in that the liquid fraction of acid gases from step d) is pumped up to a pressure level compatible with re-injection into the subsoil and is delivered into the re-injection well.

14. A method as claimed in claim 1, characterized in that the pressure at which step b) is conducted is at least 1 MPa.

15. A method as claimed in claim 6, characterized in that said physical solvent is methanol.

16. A method as claimed in claim 1, characterized in that a chemical solvent is used.

17. A method as claimed in claim 16, characterized in that said chemical solvent comprises a mixture of methanol and amine.

18. A method of treating a fluid containing hydrocarbons, methane and one or more acid gases, and producing acid gas or gases in a liquid form, comprising at least the following steps in combination:

a) bringing the fluid to be treated into contact with at least one solvent that is selective with regard to acid gas or gases to be produced in liquid form, b) regenerating the solvent from step a) containing a gaseous fraction in solution enriched with acid gases to produce a liquid solvent fraction which is recycled to step a) and a gaseous fraction containing the acid gas or gases, characterized in that regenerating step b) comprises first and second successive distillations, said first distillation which separates solvent entrained acid gases comprising cooling the solvent in a distillation zone to produce a vapour phase and a solvent, and said second distillation comprising at least partially condensing the vapour phase from said first distillation at a temperature less than ambient temperature to condense a liquid phase rich in acid gases, and then separating a resulting gaseous fraction and liquid fraction rich in acid gases, and recycling said gaseous fraction to step a), and characterized in that said regenerating step b) is conducted at a pressure whose value is at least greater than a bubble pressure of the acid gas or a bubble pressure of the mixture of acid gases produced in liquid form.

19. The method according to claim 18, characterized in that said second distillation is conducted at a temperature between −20 and −40° C.

* * * * *